Oct. 24, 1961  L. G. COLE ET AL  3,005,514
FLUID TREATING COLUMNS
Filed April 20, 1959
Fig. 1.
Fig. 3.
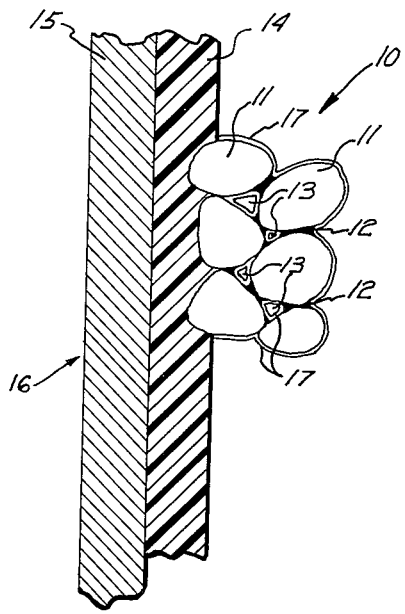
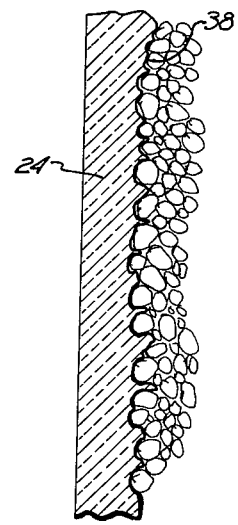
Fig. 2.
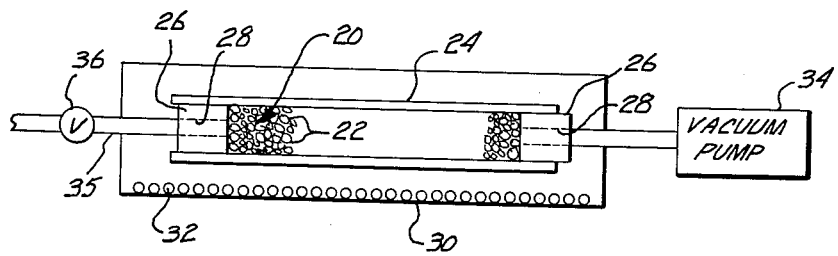
INVENTORS.
LELAND G. COLE
STUART A. GORDON
BY
Christie, Parker & Hale
ATTORNEYS

United States Patent Office 3,005,514
Patented Oct. 24, 1961

3,005,514
FLUID TREATING COLUMNS
Leland G. Cole, Arcadia, Calif., and Stuart A. Gordon, Downsview, Ontario, Canada, assignors, by mesne assignments, to Consolidated Electrodynamics Corporation, Pasadena, Calif., a corporation of California
Filed Apr. 20, 1959, Ser. No. 807,412
8 Claims. (Cl. 183—2)

This invention relates to columns for treating fluids, and more particularly to columns which contain a matrix of a solid material that is porous and permeable to the flow of fluids through it.

This invention finds its greatest use in chromatographic columns, and is specifically described with reference to such columns. However, the invention is also applicable to other types of columns, such as absorption and extraction columns.

A typical chromatographic column includes a body of granular solid material or absorbent packed in a tube or envelope which has a smooth interior surface. The body of absorbent is packed so that it is permeable to the flow of fluid through the tube or envelope. The fluid to be analyzed or treated is passed through the column so that it comes in intimate contact with the solid absorbent.

In chromatographic analysis of a fluid containing several components of different adsorption characteristics, the various components are separated as the fluid flows through the column. On subsequent flushing of the column with a carrier gas or elutriator, the various components are displaced in accordance with their affinity for the adsorbent, the most loosely bound or weakly adsorbed components being displaced first, and the more firmly adsorbed components being displaced last.

Under ideal conditions, the displacement of the various components from the adsorbent takes place in "bands" as the elutriator is passed through the column so that there is a sharp distinction between one constituent and an adjacent constituent. However, under practical conditions, there is some "hang-up" of constituents being displaced, resulting in what is comonly called "peak tailing," which interferes with the accurate analysis of chromatographic samples. Peak tailing is aggravated when there is non-uniform flow of fluid through the column, causing departure from the ideal frontal displacement of the materials within the column in a plane perpendicular to the direction of flow.

One important cause of non-uniform displacement of fluid from a packed column is the relatively large cross-sectional path available for fluid flow between the matrix of adsorbent and the smooth column wall. Thus, relatively large quantities of fluids can flow more rapidly through this sizeable cross-sectional area than can flow through the more tightly packed interior portion of the matrix, resulting in non-uniform displacement of fluid from the column.

This invention reduces, or even entirely eliminates the by-passing of fluids in columns through the matrix-column wall interface by providing a solid, fluid-impermeable barrier in the interface between the column wall and the matrix. With the improvement of this invention, there is little or no flow of fluid through the matrix-column wall interface, so that virtually all fluid flowing through the column must pass through the interstices of the column interior.

Briefly, this invention contemplates a column for treating a fluid, the column comprising a fluid impermeable envelope having an inlet and an outlet. A porous and permeable matrix having a plurality of interconnected interstices is sealed within the envelope between its inlet and outlet, and means are provided for forming an impermeable barrier between the envelope wall and the periphery of the matrix.

In the preferred form, the means for forming the impermeable bond between the wall and the matrix periphery is a resin or adhesive which makes a tight bond to the wall and penetrates the interstices near the surface of the matrix adjacent the envelope wall to form a tight bond with the surface particles of the absorbent matrix.

In another form of the invention, the interior of the envelope or column wall is deformed, or made irregular, so that it protrudes into a substantial portion of the interstices at the surface of the matric adjacent the envelope wall.

The problem of fluid by-passing through the matrix-column wall interface is most severe in columns of large aspect ratio, that is, a large ratio of column length to column diameter, such as is advantageously used in chromatographic columns. The reason for this is that the width of the bypass interface is substantially constant, and as the diameter of the column is reduced, which is desirable for rapid and accurate analysis when sample quantities are limited, the bypass interface becomes a larger proportion of the cross-sectional area available for fluid flow through the column.

The improvement of this invention minimizes or eliminates the passage of fluid between the walls of the column and the matrix particles, thus providing a considerable increase in column efficiency by eliminating the fluid velocity gradient which occurs in typical columns of the prior art. These and other aspects of the invention will be more fully understood from the following detailed description in which:

FIG. 1 is an enlarged fragmentary sectional view of a matrix-column wall interface treated in accordance with this invention to provide a fluid-impermeable barrier in the interface;

FIG. 2 is a schematic sectional elevation of one method of this invention for deforming the interior of the column wall to protrude into the interstices on the surface of the matrix; and FIG. 3 is an enlarged fragmentary sectional elevation of the final product produced by the apparatus of FIG. 2.

Referring to FIG. 1, a porous and fluid-permeable matrix 10 includes a plurality of individual solid adsorbent particles 11 held together by a binder 12 disposed in the interconnected interstices 13 of the matrix. The surface of the matrix is bonded by a coating of resin 14 to the interior of a column wall 15, which can be of any suitable material such as glass or metal. The column wall is part of a container 16 which makes up a chromatographic column having an inlet (not shown) and an outlet (not shown) through which fluid is introduced and removed from the matrix in the column. The column can be of any suitable shape in cross section, say circular.

The particular chromatographic column shown in FIG. 1 is useful in a type of analysis usually known as "partition gas chromatography," and the adsorbent particles are coated with a film of "partition" liquid 17, such as di-butyl phthalate. In this method a stream of carrier gas carrying the sample in the vapor phase passes over the surface of the so-called partition liquid, which does not entirely fill the interstices, thereby leaving the column permeable to the flow of gas through it. The various components of the gas have different solubilities in the liquid, and consequently are held up in a manner roughly proportional to their solubilities. As a result, the various components progress at varying rates along the column containing the partition liquid and the components tend to separate as they pass through the column. A detector (not shown) at the column outlet indicates the amount of each component present, while the time of arrival indicates the composition of each component.

The partition liquid is present in the form of a thin film with as large a surface area as possible. To obtain this effect the liquid is usually absorbed on a porous medium, such as Celite, brick dust, or even soap chips.

The resin 14 makes a fluid-tight seal against the interior of the column wall and extends into the interstices on the surface of the matrix adjacent the column wall so that the interfacial cross-sectional area between the matrix and the column wall is filled with solid resin, which provides a fluid-impermeable barrier in the space between the matrix and the column wall. Thus, any fluid flowing through the chromatographic column, say vertically as viewed in FIG. 1, is forced to flow through the interior portion of the matrix and cannot by-pass or "finger" ahead through the space that would normally be open between the matrix and the column wall, were it not for the presence of the resin 14.

The apparatus of FIG. 1 can be constructed in any one of several different ways. For example, the solid particles of adsorbent are mixed with a minimum quantity of binder which is just sufficient to wet the matrix particles as shown in FIG. 1. The mixture of binder and adsorbent particles is disposed in a mold, which is thereafter treated to effect a curing of the binder, such as by the application of heat, pressure, oxidizing atmosphere, catalyst, or other agent, depending on the binder used. The binder can be any suitable material which is inert to the fluids flowing through the column. Preferably it is the same as the resin used in the wall-matrix interface.

If the binder is a phenolic resin, the mold is either heated or else a suitable well-known phenolic resin catalyst is used. If an epoxy resin is used, such as Epocast 3 (sold by Furane Plastics), then the mold is heated to a temperature of about 250° F. for four hours.

After the adsorbent particles are bonded together, the matrix is removed from the mold and its outer surface is coated with additional bonding agent, or resin, to substantially fill the interstices located on the surface of the matrix which is to be adjacent the column wall. Depending on the anticipated use of the matrix, it is now in condition to be used without any further treatment, care having been taken to select a binding agent or resin such as plastic, varnish, lacquer, etc., which is insoluble in the fluids to be passed through the matrix and has a softening point in excess of operating temperature for the matrix. However, it is preferable to insert the matrix in a protective sheath or column 16. This is done by first wetting the interior of the column wall with a binding agent and then slipping the matrix into the position shown in FIG. 1. The cross-sectional area of the matrix is of the same shape and only slightly less than that of the column so that the thickness of the resin on the column wall interior is greater than the difference in cross-sectional dimensions. In this way, the space between the column wall and matrix is completely filled with resin, as shown in FIG. 1. Thereafter, the liquid binder between the matrix and the column wall is cured as previously described.

An alternate procedure is to start with the column empty, and coat its interior wall with the resin or binder. Thereafter, and before the binder is cured, a small quantity of adsorbent is sprinkled or dusted into the column as it is rotated about a horizontal axis, causing a layer of adsorbent granules to be imbedded or stuck in the resin coating the interior of the column wall. Thereafter, the resin is cured so that the granular particles in contact with it are firmly locked in position. Finally the column is subsequently packed with additional adsorbent granules to the desired density. In this case, the binder for the interior adsorbent particles may be omitted, with a slight gain in permeability and working surface area. However, the column is not as stable, in that it may change its characteristics due to vibration causing a shifting of the particles.

Referring to FIG. 2, a matrix 20 of a plurality of packed adsorbent granules 22 is disposed within a cylindrical column 24 closed at each end by a closure 26 having a longitudinal opening 28 through it. The column may be of any suitable material, such as glass, or a thermoplastic, such as the cellulose esters, methyl methacrylate, or polystyrene. The column is enclosed by an oven 30 which includes suitable heating coils 32 supplied heat by any suitable means (not shown). The right (as viewed in FIG. 2) closure has its opening connected to a vacuum pump 34. The opening in the left closure is connected by tube 35 to a valve 36, which is closed. The vacuum pump is turned on to reduce the pressure inside the column, and the oven is turned on to raise the temperature of the column to its softening point so that the column wall is forced tightly against the matrix, causing a deformation of the interior of the column wall to match the interstices at the surface of the matrix.

The heating coils in the oven are de-energized, permitting the oven and column wall to cool to room temperature so that the column sets rigidly in the form shown in FIG. 3. Thus, the interior of the column wall includes a plurality of inwardly extending protuberances 38 which substantially match the interstices and irregularities of the external surface of the matrix adjacent the column wall. In effect, there is a solid and fluid-impermeable barrier between the column wall and the matrix.

The same result as that shown in FIG. 3 can also be obtained by heating a plastic tube with a high temperature coefficient of expansion so that it makes a snug fit around a body of matrix granules packed to a density slightly less than that finally desired. In this case, the plastic tube is allowed to cool, collapse, and simultaneously penetrate the surface pores of the solid matrix to give the structure shown in FIG. 3.

In another form, a solid column (not shown) of an adsorbent and plaster of Paris is made as described in U.S. Patent 2,723,756 and is either enclosed in a plastic or glass envelope as described with respect to FIGS. 2 or 3, or has its surface coated with a resin, or other agent as described with respect to FIG. 1. In such a case, the binding agent penetrates the column to the required depth to insure pore size uniformity in the remaining unpenetrated cross-section of the column.

The result equivalent to that shown in FIG. 3 is also obtained by incorporating varying degrees of surface etching, mechanical roughening, etc. on the internal surface of presently employed columns, selecting the ranges of mean sizes of surface protuberances to maximize the intimacy of contact between the column wall and the matrix material. For example, if the column wall is glass, its interior is etched with hydrofluoric acid to produce minute pits that make an interlocking contact with an extremely finely divided adsorbent such as activated charcoal.

Band developments within chromatographic columns built in accordance with the foregoing principles are detected externally by using sheathing which is transparent to the detection device, but still impervious to the fluid flow. For example, the visual observation of colored bands, and the ultraviolet examination of bands is conducted in adsorbent matrices sheathed in cellulose acetate. Such a structure is particularly useful in the analysis of alkaloids, natural polyenes, and many vitamins, such as A, D, E, and K. The structure of this invention is also used for the ultraviolet examination of non-radiating bands of adsorbent materials and columns made totally fluorescent by incorporation of fluorescent materials in the column matrix during preparation. In addition, dielectric constant electrodes (not shown) are also easily incorporated at many points along the column for detecting bands.

As previously indicated, a major problem in the commercial production of chromatographic columns is the packing of the columns evenly and firmly to get a homogeneous packing that does not change its characteristics with vibration, such as occurs during shipping. Moreover, since a great variety of partition liquids can be used, it is desirable that the column with reproduceable characteristics be available so that it can be cleaned and reactivated for use with different adsorbents. An alternate method for producing the structure of FIG. 1 is to leach an elongated rod of borosilicate glass (a mixture of boric oxide and silicate) with a strong acid such as hydrofluoric until substantially all the boric oxide is removed, leaving a porous and fluid-permeable skeleton of quartz. By varying the amount of boric oxide in the glass, different degrees of porosity are obtained. The column is then shrunk on the porous core to provide a non-porous outer skin in intimate contact with the core so fluid can not bypass any portion of the core. Thus the completed column can be filled, cleaned, and refilled with adsorbent liquids or partition liquids as often as desired. The non-porous outer skin can be assembled on the porous core in any other ways, such as those described with respect to FIG. 2. An important advantage of a matrix made from a leached glass rod is that the rod can easily be shaped by normal glass blowing techniques to any desired form, such as coiled, joined, etc., and then leached.

Various modifications of the preceding example are possible. For example, powdered glass (not shown) is assembled with a binder, applied to the surface of the porous core, and then fired to glaze the outer surface and form the outer fluid impermeable skin. The powdered glass can be held together by any suitable binder, even a slurry of plain water and glass is satisfactory. The slurry is applied as a thin paste to the exterior surface of the porous core, which takes up part of the water from the paste. The porous core and coating of powdered glass is then fired just sufficiently to glaze the powdered glass into a glassy coat to serve as the outer skin for the column. Organic binders, such as shellac, could also be used since the binder disappears on firing.

We claim:

1. A chromatograph column for chromatographic analysis of a gas, the chromatograph column comprising a fluid-impermeable envelope having an inlet and an outlet, a porous and permeable matrix having a plurality of interconnected interstices sealed within the envelope between its inlet and outlet, the matrix substantially filling the envelope, the interior of the envelope being disposed to extend into at least a part of the interstices at the periphery of the matrix between the inlet and outlet of the envelope, and a thin film of liquid chromatographic adsorbent disposed in the matrix to leave the interstices partially empty so the column is permeable to the flow of gas through it.

2. A chromatograph column for chromatographic analysis of a gas, the chromatograph column comprising a fluid-impermeable envelope having an inlet and an outlet, a body of solid pieces packed in the envelope between its inlet and outlet to provide a plurality of interconnected interstices, a thin film of liquid chromatographic adsorbent disposed on the solid pieces to leave the interstices partially empty so the column is permeable to the flow of gas through it and means on the interior of the envelope disposed to extend into at least a part of the interstices at the periphery of the body of pieces between the inlet and outlet of the envelope.

3. Apparatus according to claim 2 which includes means for rigidly bonding the pieces together.

4. A chromatograph column for chromatographic analysis of a gas, the chromatograph column comprising a fluid-impermeable envelope having an inlet and an outlet, a porous and permeable matrix having a plurality of interconnected interstices sealed within the envelope between its inlet and outlet, a thin film of liquid chromatographic adsorbent disposed on the solid pieces to leave the interstices partially empty so the column is permeable to the flow of gas through it and a plastic resin bonded to the interior of the envelope and disposed to extend into at least a part of the interstices at the periphery of the matrix between the inlet and outlet of the envelope.

5. A chromatograph column for chromatographic analysis of a gas, the chromatograph column comprising a fluid-impermeable envelope having an inlet and an outlet, a porous and permeable matrix having a plurality of interconnected interstices sealed within the envelope between its inlet and outlet, the interior of the envelope having a rough surface which extends into at least a part of the interstices at the periphery of the matrix between the inlet and outlet of the envelope, a thin film of liquid chromatographic adsorbent disposed on the solid pieces to leave the interstices partially empty so the column is permeable to the flow of gas through it.

6. Apparatus according to claim 5 in which the envelope is glass and its interior surface is etched.

7. The method for making a chromatograph column for chromatographic analysis of a gas, the method comprising forming a body of a mixture of at least two solid components, one of the components being soluble in a liquid and the other being insoluble in it, leaching the soluble component from the body to form a porous, fluid-permeable matrix with an irregular surface, disposing a deformable envelope around the matrix, deforming the interior surface of the envelope to match that of the matrix and make an interlocking fit against it, rigidifying the envelope while it is so deformed and coating the interior surface of the porous matrix with a thin film of liquid chromatographic adsorbent to leave the interstices partially empty so the column is permeable to the flow of gas through it.

8. The method for making a chromatograph column for chromatographic analysis of a gas, the method comprising forming a body of a mixture of at least two solid components, one of the components being soluble in a liquid and other being unsoluble in it, leaching the soluble component from the body to form a porous, fluid-permeable matrix with an irregular surface, covering at least a portion of the matrix surface with powdered glass, glazing the powdered glass to form a fluid-impermeable coating on the matrix and coating the interior surface of the porous matrix with a thin film of liquid chromatographic adsorbent to leave the interstices partially empty so the column is permeable to the flow of gas through it.

References Cited in the file of this patent

UNITED STATES PATENTS

| | | |
|---|---|---|
| 1,081,573 | Boeck | Dec. 16, 1913 |
| 1,988,478 | Broadwell et al. | Jan. 22, 1935 |
| 2,149,133 | Cohn | Feb. 28, 1939 |
| 2,297,248 | Rudolph | Sept. 29, 1942 |